Nov. 16, 1926.  
A. M. GREENE, JR  
CONTROL DEVICE FOR LUBRICATING APPARATUS  
Filed Oct. 10, 1925
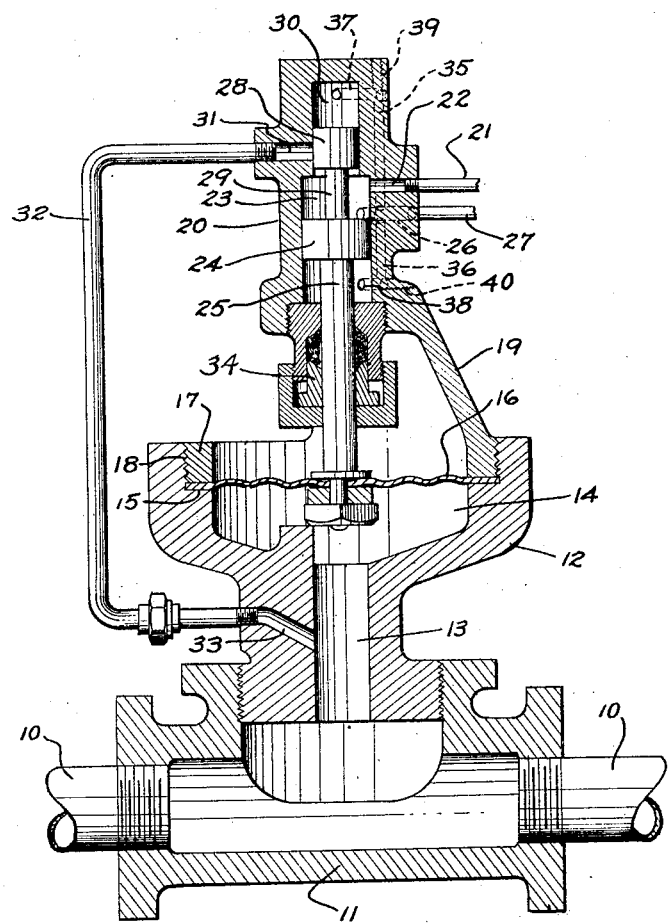

Patented Nov. 16, 1926.

1,606,758

UNITED STATES PATENT OFFICE.

ARTHUR M. GREENE, JR., OF PRINCETON, NEW JERSEY, ASSIGNOR TO NATHAN MANUFACTURING COMPANY, OF NEW YORK, N. Y.

CONTROL DEVICE FOR LUBRICATING APPARATUS.

Application filed October 10, 1925. Serial No. 61,815.

This invention relates generally to a device for automatically controlling the supply of lubricant or other fluid to a fluid pressure chamber in accordance with the pressure conditions in the chamber.

A general object of the invention is to provide means responsive respectively to an operative or non-operative condition of a machine to cause lubricating material to be supplied to the machine when in operation and to cut off the supply of lubricant to the machine during periods when the machine is not in operation.

The invention consists of a control device arranged in cooperating relation to a line or conduit through which lubricant is supplied to a fluid-pressure operated machine, the control device being arranged to respond to the pressure of the operating fluid to permit lubricant to pass through the line into the machine, and to cut off the supply of lubricant to the machine when the pressure falls in response to a non-operating condition thereof.

An example of a practical application of the invention is in connection with a booster engine construction for locomotives wherein the booster or supplemental engine is used only at irregular intervals as in climbing grades or in starting a train under heavy load. In constructions of this nature it is desirable to supply lubricant to the booster engine during the operation and to shut off the flow of lubricant during the periods when the booster engine is not in operation.

A more specific embodiment of the invention includes a control valve structure arranged in cooperative relation to a line of piping through which lubricating material is supplied to the steam supply pipe leading to the booster engine cylinders. The valve structure is operatively connected to an actuating member to which steam from the supply pipe is accessible, the actuating member, which may be in the form of a diaphragm, responding to the pressure of the steam when supplied to the cylinder to move the valve structure to a position to permit lubricating material to flow into the machine. In order to move the valve structure to cut-off position to prevent the flow of lubricant to the machine during periods of inoperation which are naturally accompanied by the disappearance of steam pressure, a differential piston structure is included in the valve mechanism and arranged to move the valves to shut-off position in response to the pressure existing in the lubricating line itself.

It will thus be seen that the existence of pressure in a fluid chamber automatically brings about the introduction of lubricant into the chamber, while the absence of pressure in the chamber automatically shuts off the flow of lubricant into the chamber. Another aspect of the invention consists in the provision of means for mixing two fluids which includes a controlling device for permitting the passage of one of the fluids into a mixing chamber, only when the other fluid is already present, under pressure, in the chamber.

Other features of the invention will be hereinafter referred to.

In the drawings, in which a preferred form of the invention has been selected for illustration, a single view in vertical section of a lubricant feeding device embodying the invention is shown.

Referring to the drawings for a more detailed description of the invention, at 10 is shown a supply pipe for fluid such as steam, the pipe being used to deliver the fluid to any desired apparatus such as a fluid-operated engine or pump. As has already been pointed out the invention herein is particularly designed for use in connection with the booster or supplemental engine used in connection with railroad locomotives.

The controlling device for feeding lubricant into the steam line leading to the booster engine, which embodies the invention herein, is mounted on a suitable T-coupling 11 which is inset between two adjoining sections of the steam line 10 already referred to. The T-coupling 11 forms a support for a frame member 12 which is provided with a passageway 13 communicating with the interior of the coupling 11 and thereby having communication with the body of steam passing through the line or conduit 10.

The frame member 12 has a bowl-shaped opening 14 in its upper portion which provides an annular shoulder or seat 15 for the support of a diaphragm member 16 which is held in steam-tight contact with the seat 15 by the engagement therewith of an annular frame member 17 having screw-threaded relation at 18 with the inner surface of the bowl portion 14 of the frame member 12.

The annular diaphragm-holding member 17 is provided with an upstanding bracket portion 19 which terminates at its upper end in a chamber extension 20 with which an oil conduit 21 communicates by means of a port or passageway 22 with a chamber 23 formed in the extension member 20.

A piston valve 24 is arranged to operate in the extension member 20 and is connected through a stem or shaft 25 with the diaphragm 16 already referred to. Another port or passage 26 is provided for communication with the chamber 23 and serves to form a return path for oil delivered into the chamber 23 from the pipe 21 when the piston valve 24 is in the lowered position shown in the drawings so that the oil pumped into the chamber 23 through the pipe 21 returns by way of the passage 26 and pipe 27 to the supply reservoir. It will be seen that the lowered position of the valve 24 which is shown is brought about when a correspondingly lowered position of the diaphragm 16 is had consequent upon the absence of pressure in the fluid pressure line 10 and the communicating chamber 14 beneath the diaphragm 16.

By this structural arrangement, a non-operative condition of the apparatus to which the steam line leads which follows the shutting off of steam to the apparatus, brings about a cessation of the supply of lubricant to the apparatus and diverts oil or other lubricant pumped into the chamber 23 through the pipe 21 through the return pipe 27 to the oil supply reservoir.

In order to automatically bring about the supply of oil to the steam line 10 and thence to the cylinders and pistons of the booster engine, or other apparatus, the valve 24 is arranged to be moved to an elevated position through the action of the pressure fluid in the chamber 14 against the lower surface of the diaphragm 16. A supplemental or secondary piston valve member 28 is mounted on a stem 29 in a tandem arrangement with relation to the main piston valve 24. The supplemental or secondary piston valve member 28 is arranged to operate between the chamber 23 and a supplemental chamber 30 formed in the extension member 20 in axial alinement with the main chamber 23. From one side of the secondary chamber 30 a port 31 leads and a pipe 32 communicates with this port and with a port 33 leading into the passageway 13 forming the communication between the diaphragm chamber 14 and the interior of the supply pipe 10 or to any other point of the system.

The relation between the supplemental piston valve 28 and the port 31 is such that when the valve 28 occupies an elevated position brought about through the pressure of the operating fluid against the under side of the diaphragm 16, the valve 28 uncovers the port 31. At the same time the main valve 24 has moved into obstructing relation to the outlet port 26 through which oil is returned to the supply reservoir when the piston and diaphragm are in their lowered positions. It will thus be seen that the lifting of the diaphragm 16 in response to the pressure of operating fluid thereagainst shuts off the return of oil to the supply reservoir and establishes communication between the oil delivery line 21 and the outlet port 31 through which oil is passed into the pipe 32 and through the port 33 into the passageway 13 and thereby into the body of steam or other fluid carried by the supply line 10.

In order to produce an oil-tight fit of the stem 25 in the chambered extension 20 a gland device 34 is provided at the lower end of the chamber 23 and through which the stem 25 passes.

In order to remove lubricant which may leak beyond the moving parts at the outer ends of the chambers 23 and 30 oil drain channels 35 and 36 are drilled into the body portion of the chambered extension 20 to provide communicating passages between the port 26 and the outer ends of the chambers referred to. Lateral extensions 37 and 38 of the passageways 35 and 36 are provided, plug members 39 and 40 being provided to shut off the communication formed between the passages 35 and 36 and the exterior of the member 20 in the drilling or other channel-forming operations.

It will thus be seen that a control device has been provided for automatically causing lubricant to be supplied to an apparatus when the apparatus is in operation and, on the other hand, for automatically cutting off the supply of lubricant to the apparatus when the apparatus is in a condition of non-operation, the cutting off effect being produced by the drop of pressure in the fluid used in the operation of the apparatus.

Upon the drop of pressure beneath the diaphragm the pressure of oil against the upper surface of the lower piston 24 produces a downward movement of the valves and diaphragm to a position wherein the upper piston 28 cuts off the conduit 32 and the lower piston opens the port 26 leading to the return oil line 27. The differential effect produced by the pistons of different size is thus utilized to bring about movement of the pistons in one direction.

It will be understood that numerous variations and modifications may be made in the construction shown and described without departure from the invention as defined in the appended claims.

What I claim is:

1. In a device for supplying lubricant to a fluid pressure chamber, a conduit through which lubricant may be supplied to the chamber, a piston valve arranged to be moved to open or close said conduit, a diaphragm subject to pressure conditions in said chamber, a valve stem connecting said diaphragm and said piston valve, a second piston valve on said valve stem having a diameter different from the diameter of the first named piston valve, a chamber for said valves, and said chamber being provided with a lubricant supply port located between said valves.

2. In a device for supplying lubricant to a steam chamber, a conduit through which lubricant is supplied to the chamber, a piston valve arranged to be moved to open or close the conduit, a diaphragm subject to pressure conditions in the steam chamber, a stem connecting the diaphragm and the piston valve whereby pressure in the chamber will act through the diaphragm to open the conduit, a second piston valve mounted on the stem between the diaphragm and the oil conduit controlling valve, the diameter of the second piston valve being larger than the diameter of the conduit control valve, and a chamber for said valves provided with a port between the valves through which lubricant is supplied to the chamber under pressure.

3. In a device for supplying lubricant to a steam chamber, a diaphragm subject at one side to the pressure in the steam chamber and open at the other side to atmosphere, a valve stem connected at one end to the diaphragm, a pair of spaced apart piston valves mounted on the valve stem, a valve chamber in which said piston valves are adapted to have sliding movement, said valve chamber being provided with an inlet port between said pistons through which lubricant is forced under pressure, a conduit connecting the valve chamber and the steam chamber, said conduit being controlled by one of said piston valves, and said piston valves being relatively proportioned to provide a differential action and cooperate with atmospheric pressure on the diaphragm to close the conduit when there is sub-atmospheric pressure in the steam chamber.

4. In a device for supplying lubricant to a fluid pressure chamber, a conduit through which lubricant may be supplied to the chamber, a member provided with an elongated chamber extending transversely of said conduit, a piston valve in said chamber arranged to open or close that portion of said conduit which leads from the elongated chamber to the fluid pressure chamber, a return conduit leading from said chamber to the source of supply of lubricant, a second piston operating in said conduit to open said return conduit when the other piston is in obstructing relation to the chamber supply conduit and vice versa, branch conduits connecting the opposite ends of the piston chamber with the return conduit, and means subject to the pressure in said fluid chamber for operating said valves.

5. In a device for supplying lubricant to a fluid pressure chamber, a conduit through which lubricant may be supplied to the chamber, a member provided with an elongated bore extending transversely of said conduit, a diaphragm subject to the pressure in said fluid chamber and having a stem member extending axially of said bore, a pair of spaced apart piston valves carried by said shaft, a return conduit extending from said bore to the source of lubricant supply, one of said pistons being arranged to open or close that section of the conduit extending from the bore to the fluid pressure chamber, the other of said pistons being arranged to open or close said return conduit, and one of said pistons having a greater area than the other whereby to move the valves in one direction when no pressure exists in said chamber.

Signed at Princeton, in the county of Mercer and State of New Jersey, this 8 day of October, 1925.

ARTHUR M. GREENE, Jr.